Nov. 20, 1951

G. K. HENNEY 2,575,873

MOTORIZED VEHICLE

Filed March 14, 1946

INVENTOR.
GEORGE KENNETH HENNEY.
BY
Cecil F Arens
ATTORNEY.

Nov. 20, 1951  G. K. HENNEY  2,575,873
MOTORIZED VEHICLE
Filed March 14, 1946  5 Sheets-Sheet 4

INVENTOR.
GEORGE KENNETH HENNEY.
BY
Cecil J Arens
ATTORNEY.

Nov. 20, 1951  G. K. HENNEY  2,575,873
MOTORIZED VEHICLE

Filed March 14, 1946  5 Sheets-Sheet 5

INVENTOR.
GEORGE KENNETH HENNEY.
BY

ATTORNEY.

Patented Nov. 20, 1951

2,575,873

UNITED STATES PATENT OFFICE 2,575,873

MOTORIZED VEHICLE

George K. Henney, South Bend, Ind., assignor to Bendix Aviation Corporation, South Bend, Ind., a corporation of Delaware Application March 14, 1946, Serial No. 654,282

1 Claim. (Cl. 180—33)

This invention relates to power-driven bicycles and more particularly to the combination of an engine and wheel assembly which can be used to replace the rear wheel of the conventional bicycle with a minimum of changes.

One of the more important objects of the invention resides in the provision of an engine for a rear bicycle wheel having a hub of standard width on which the engine is carried.

Another important object of the invention lies in the provision of an engine and clutch assembly enclosed in a unitary housing suspended from a rear wheel hub which fits between the rear fork of a conventional bicycle.

A still more important object of the invention is to provide a driving apparatus carried by the hub of a wheel which fits a conventional bicycle.

A further feature of the invention resides in the provision of a novel clutch mechanism whereby a power driven bicycle may be conveniently shifted to low, high or neutral gear at the will of the operator.

The above and other objects and features of the invention will be apparent from the following description of the apparatus taken in connection with the accompanying drawings which form a part of this specification and in which.

Figure 1:
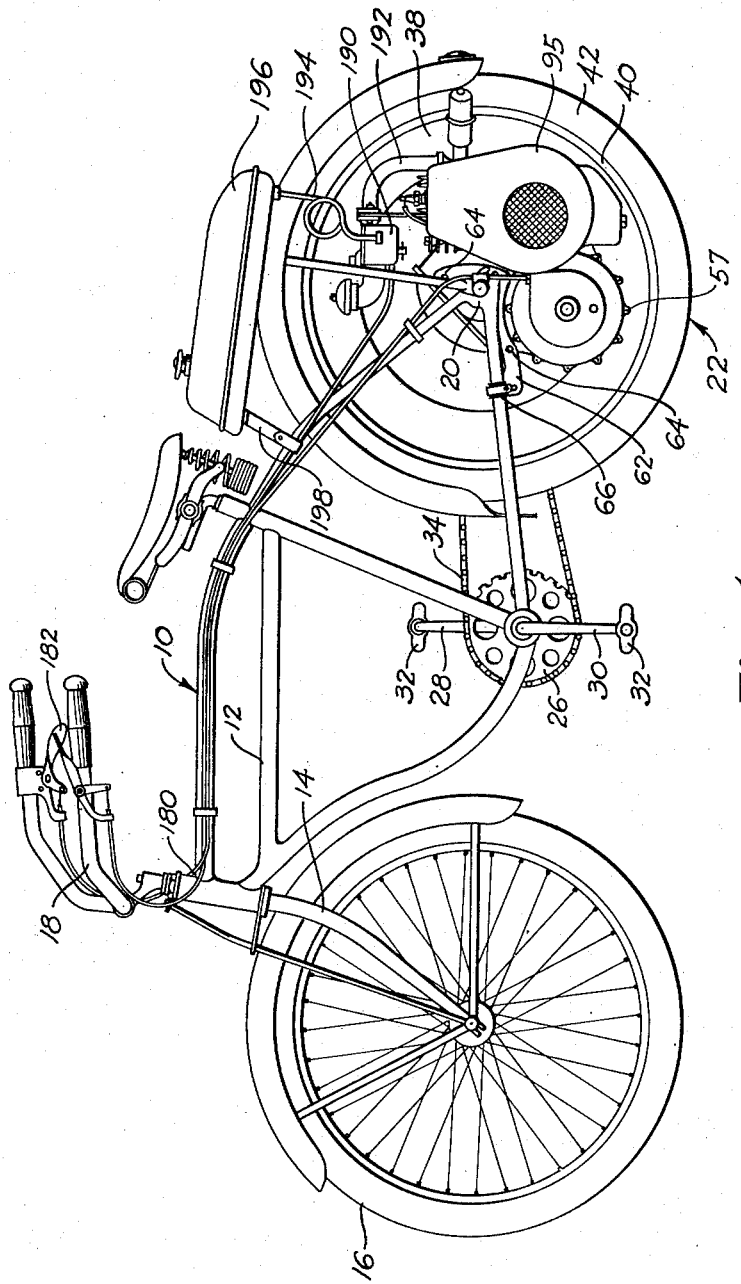
Figure 1 is a side elevation of a bicycle on which the apparatus of the invention is mounted.
Figure 2:
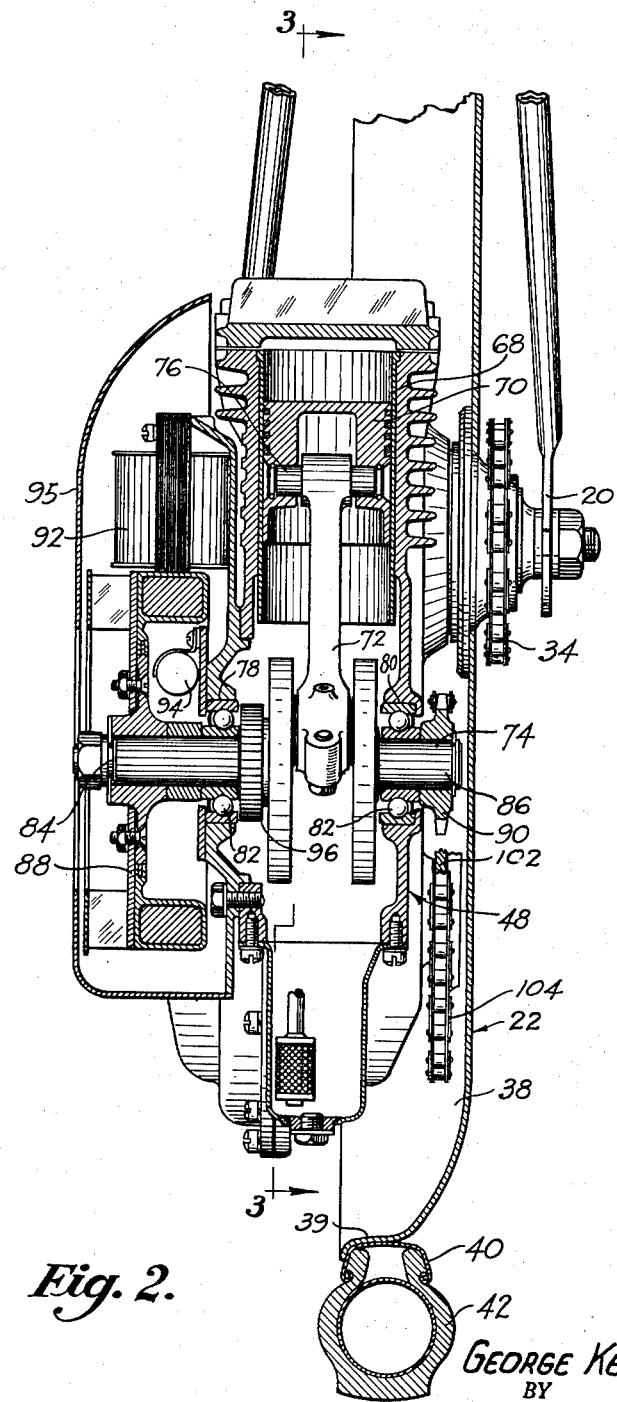
Figure 2 is a transverse vertical section through the engine.
Figure 3:
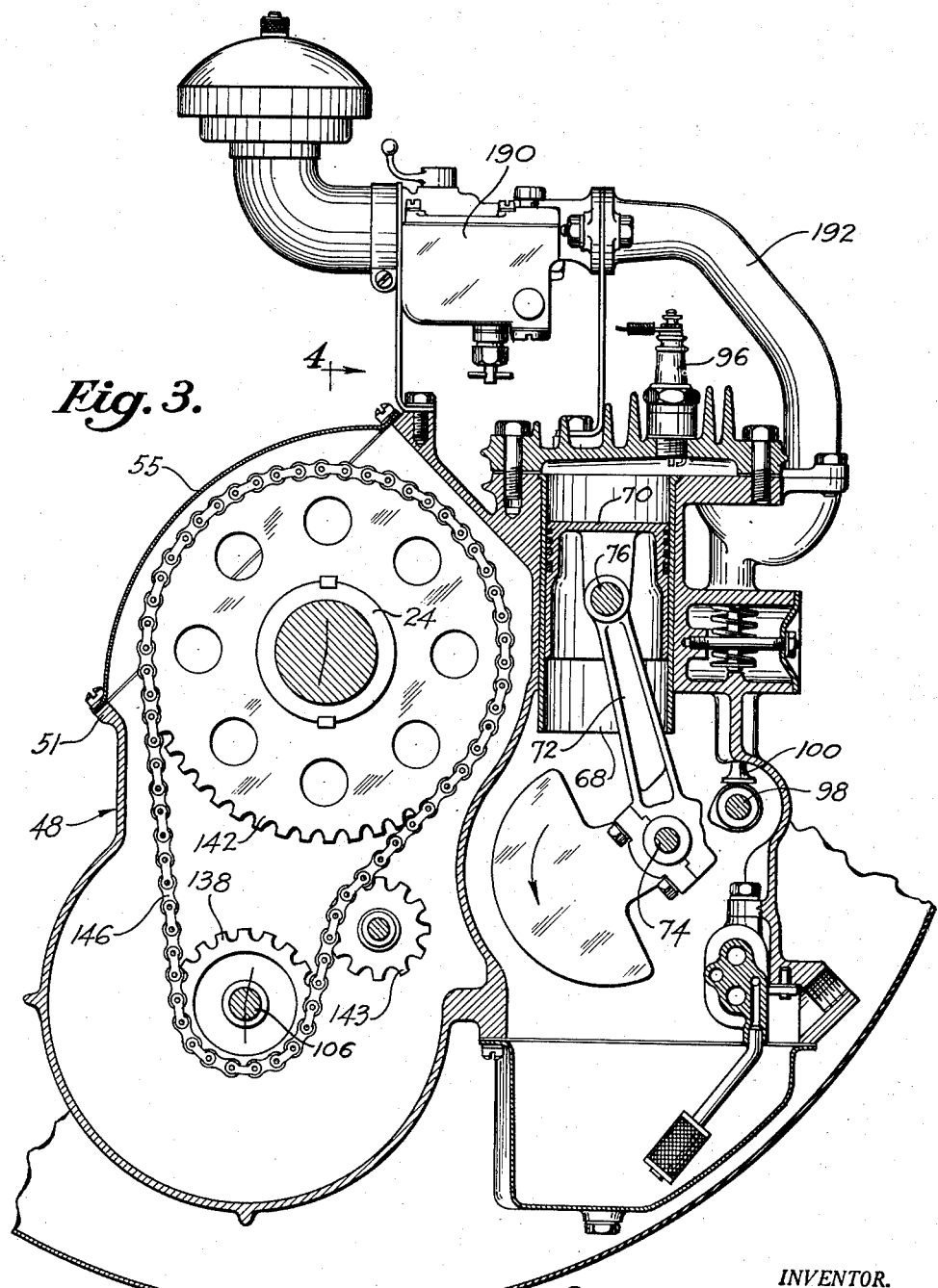
Figure 3 is a section partly in elevation taken substantially on the line 3—3 of Figure 2.

Referring now to Figure 1 of the drawings, a bicycle is designated by the numeral 10, having a standard frame 12 to which is pivotally secured a bifurcated member or fork 14 constituted to receive a front wheel 16. A steering handle or handlebar 18 is carried by the fork 14 and suitably secured to the fork to guide the front wheel 16. A rear fork 20 is integral with the frame 12 and is of standard dimensions to accommodate a standard bicycle wheel 22 of the type shown in Figure 1, having a hub 24. The bicycle 10 is provided with a sprocket wheel 26 fixed to a pair of oppositely extending arms 28 and 30 having pedals 32 rotatably carried thereby for engagement with a rider's feet to drive the bicycle. An endless chain 34 connects the sprocket wheel 26 to a smaller sprocket wheel 36 of wheel 22. The wheel 22 comprises a dished-disk-like member 38 formed into sides 39 at its periphery to cooperate with a rim 40 to which the dished-disk is fixed. The rim 40 is formed to receive a tire 42. The hub 24 is of a standard type for use in the rear wheel of a conventional bicycle. A conventional type of coaster brake is housed within the hub. The coaster brake which forms no part of the invention, is of a type which brakes the wheel 22 when the sprocket 26 is rotated in one direction and which drives the wheel when the sprocket is rotated in the opposite direction. A flange 44 is integrally formed with the hub 24 and is held in driving relationship with the wheel 22 by bolts 46 which pass through the flange and disheddisk.

A housing 48 is formed with substantially parallel walls or sides 50 and 52, each wall having an opening 54 and 56 respectively therein. The housing is flanged at 49 and 51 to receive covers 53 and 55 held in place by fillister head screws 57. Bushings 58 and 60 respectively are disposed within the openings 54 and 56 to form bearings for the housing 48 which is suspended from the hub 24. The hub 24 and wheel 22 are free to rotate relative to the housing. A torque arm 62 is secured to the housing by bolt 64 and is clamped to the frame of the bicycle at 66 to prevent rotation of the housing about the hub. The housing 48 includes a cylinder 68 within which a piston 70 reciprocates. A connecting rod 72 is secured to a crank shaft 74 and to a wrist pin 76. Openings 78 and 80 in the walls 50 and 52 of the housing receive bearings 82 in which the crank shaft 74 rotates. The crank shaft 74 has ends 84 and 86 which extend beyond the walls 50 and 52 of the housing to receive respectively a flywheel 88 and a sprocket 90, both of which are fastened to the crank shaft by suitable means. The flywheel is also constructed and arranged to serve as a magneto. The flywheel in conjunction with a coil 92, and a condenser 94 forms a part of the ignition system for the engine. The coil 92 is connected to a spark plug 96 located at the top part of cylinder 68. A cover 95 extends over the flywheel 88 and is held in position in any suitable manner. A gear 96, carried by the crank shaft 74, engages a mating gear, not shown, mounted on cam shaft 98 to impart rotation thereto to actuate intake and exhaust valves, of which only the intake valve 100 is shown. The sprocket 90 fixed to the crank shaft drives an input sprocket 102 through an endless chain 104.

The input sprocket 102 is secured to a shaft 106 rotatably disposed in the housing 48 and carried by bearings 108 and 110 located respectively in openings 112 and 114 of the housing 48.

A clutch and planetary gear mechanism 120 is disposed within the housing 48 and comprises a sun gear 122 keyed to the input shaft 106 by a key 124. A ring gear 126 is carried by a spider or supporting member 128 which is freely rotatable around and axially shiftable on the shaft 106. Planetary gears 130 are disposed radially from the shaft 106 and evenly spaced apart around the circumference of the ring gear 126 and carried by a cage or supporting member 132 which is freely rotatable around the shaft 106. The spider or ring gear carrier 128 and the cage or planetary gear carrier 132 are both supported by bearings concentrically disposed around the input shaft 106. Suitable fastening studs 134, extending laterally from the supporting member 132, are provided for securing the planetary gears 130 to said supporting member 132 in a manner to permit the gears to freely rotate about their axes. These planetary gears are disposed relative to the ring gear 126 and to the sun gear 122 to mesh therewith for driving engagement. A boss 136, integral with the supporting member 132, is provided with an output member or sprocket 138 secured thereto and held against rotation relative to the supporting member 132 by a pin 140. A hub sprocket 142 is keyed to the hub 24 at 144 to rotate therewith. An endless chain 146 connects sprocket 138 to sprocket 142 to transmit torque or turning effort to wheel 22. An adjustable idler sprocket 143 is positioned in the housing to engage the chain 146 to vary the tautness thereof.

The clutch mechanism associated with the planetary gear assembly includes a conical surface 150 formed in the interior of the axially shiftable ring gear 126. Supporting member 132 is provided with a flange-like element 152 having an inclined face 154 to which is fastened a strip of material 156, having a high coefficient of friction such as cork, for example, to engage the conical surface 150. Belleville spring 158 provides yieldable means between the two gear supporting members 128 and 132. The spring has its outer peripheral portion 160 engaging supporting member 132 and its inner portion 162 seating on a bushing 164 which is carried on a sleeve-like element 166 integral with the supporting member 128. This arrangement of the spring between the two gear supporting members 128 and 132 biases the former member to the right since that member is axially movable with respect to the supporting memer 132 and with respect to shaft 106. The cone-shaped surface 150 and strip 156 are normally held in contact relationship by the spring 158 to provide a frictional clutch. A bushing 168 is disposed within the opening 114 to carry one end of shaft 106. The bushing is exteriorly threaded at 170 to receive a hub 172 integral with a control wheel 174 which provides means for axially shifting the supporting member 128 which carries the ring gear 126 and one of the clutch faces 150. The wheel 174 is equipped with a ring-like element 176 placed in the side of the control wheel to abut the supporting member 128 to move the same axially to the left to disengage the surface 150 from the strip 156 when the control wheel is rotated in a direction to cause the same to shift axially to the left. To rotate the control wheel as aforementioned, a cable 180 is secured to the periphery of the control wheel and extends along the frame 12 of the bicycle to the handlebar 18 where the cable is connected to a hand-operated lever 182. The control wheel 174 is arranged on the bushing 168 to move axially out of contact with the supporting member 128 to allow rotation thereof without rubbing the ring-like element 176 of the control wheel 174, movement of the control wheel 174 to the right is restricted by flange 167 of bushing 168. The interior of housing 48 is formed with a flat flanged portion 184 integral with the housing and covered with a strip 186, such as cork which has a high coefficient of friction, for engagement with a flat surface 188 of the ring gear 126 to thereby provide a brake therefor. This flange 184, being a part of the housing, forms a fixed member with which the ring gear engages to hold the same from rotation at times.

A carburetor 190 is connected to the interior of the cylinder 68 by a manifold 192. A tubing 194 connects the carburetor to a gas tank 196 mounted on the bicycle and securely held thereto by a supporting bracket 198.

Figure 4:
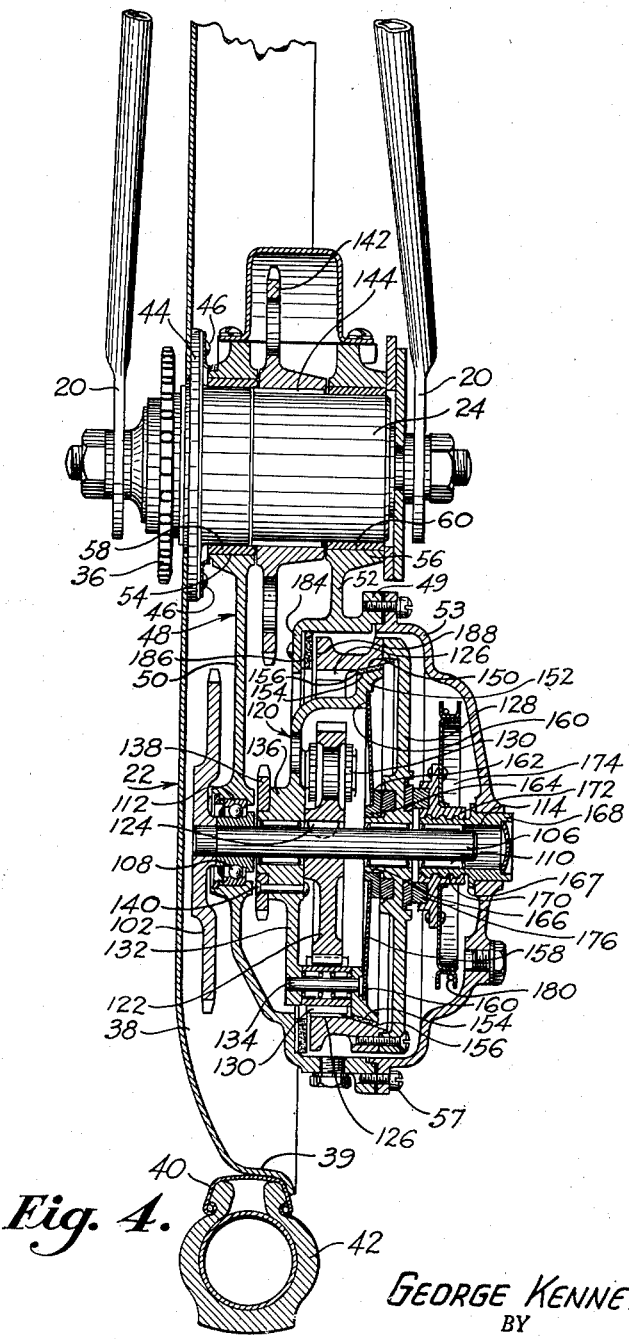
Figure 4 is a transverse vertical section taken substantially on the line 4—4 of Figure 3 through the center of the bicycle wheel and the clutch with parts shown in elevation for purpose of clarity.
Figure 5:
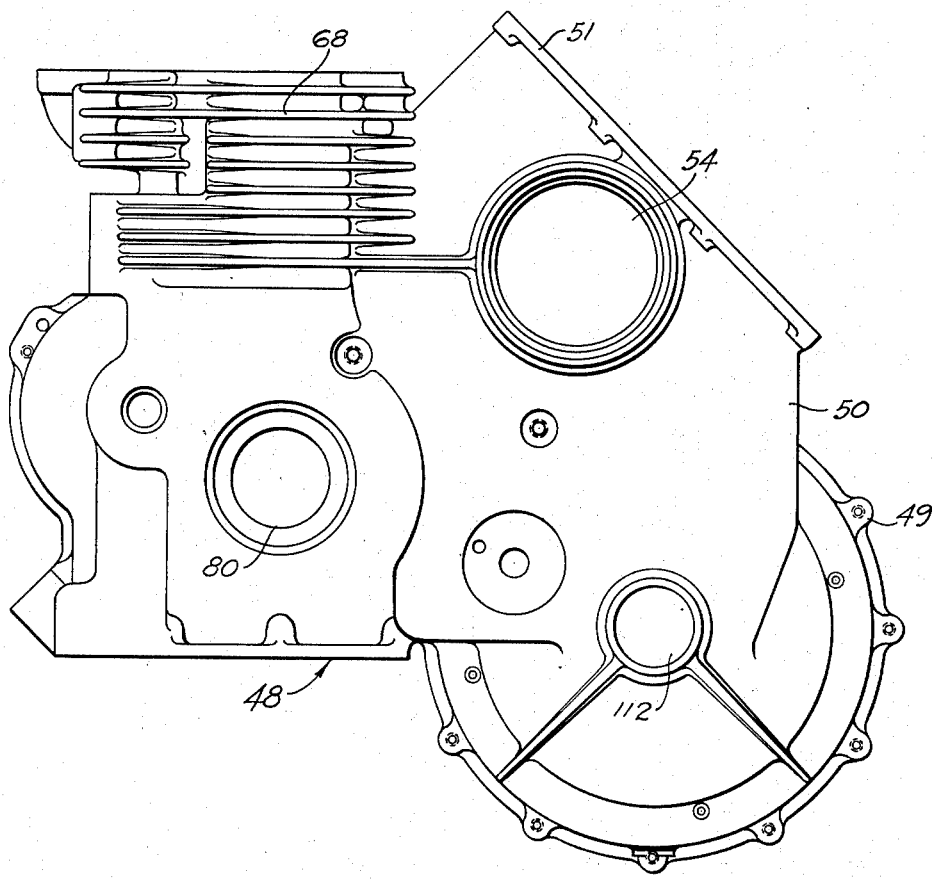
Figure 5 is a side elevation of the housing in which the engine and clutch are contained.

Operation of the bicycle is as follows:

In the position shown in Figure 4, the clutch mechanism drivably connects the planetary carrier or cage 132 to the ring gear carrier or spider 128 to drive the vehicle in high gear at a 1:1 ratio. That is, the planetary carrier, to which is fixed the output sprocket 138, is locked to the ring gear carrier by engagement of the face 150 with the cork strip 156 to provide a direct drive to the output sprocket 138. To put the bicycle in low gear the control lever 182, located on the handlebar, is operated to cause rotation of wheel 174 which is shifted axially to the left urging the ring gear carrier to the left to disengage the face 150 from the cork strip 156 and to engage face 188 with the flat cork strip 186. The ring gear 126 and its supporting member 128 are now held stationary and the sun gear 122 caused to rotate. Rotation of the sun gear 122 which meshes with the planetary gears 139 will rotate said planetary gears about their own axes to drive the cage or planetary gear supporting member 132 at a reduced speed.

The clutch has a neutral position in which the ring gear 126 is out of contact with the flat cork strip 186 and the cone-shaped cork strip 156. In this position, the ring gear and its supporting member 128 are free to rotate around shaft 106. Obviously, when the clutch is in neutral position, the bicycle may be pedaled without driving the engine.

Although this invention has been described in connection with certain specific embodiments, the principles are susceptible of numerous other applications that will readily occur to persons skilled in the art. The invention is therefore to be limited only as indicated by the scope of the appended claim.

Having thus described the various features of the invention, what I claim as new and desire to secure by Letters Patent is:

For use with a bicycle having a fork of standard width, a power apparatus for the bicycle adapted to be secured to the fork, said power apparatus comprising a wheel equipped with a hub interposed between said fork and secured thereto, a unitary housing supported on the hub and constructed and arranged so that the center of gravity of said housing is below said hub, said housing being formed with two chambers therein, one of which is located aft of said hub and the other of which surrounds said hub which passes through said latter chamber, a motor in the aft chamber and comprising a crankshaft, a transmission in said other chamber, a chain drive for connecting the crankshaft to the transmission, and a chain drive in the housing for connecting the transmission to the wheel.

GEORGE K. HENNEY.

REFERENCES CITED

The following references are of record in the file of this patent:

UNITED STATES PATENTS

| Number | Name | Date |
|--------|------|------|
| 680,825 | Westinghouse | Aug. 20, 1901 |
| 815,045 | Schmidt | Mar. 13, 1906 |
| 913,531 | Michaelson | Feb. 23, 1909 |
| 1,240,318 | Copeland | Sept. 18, 1917 |
| 1,241,563 | Schmidt | Oct. 2, 1917 |
| 1,245,692 | Dickman | Nov. 6, 1917 |
| 1,247,752 | Van Antwerp | Nov. 27, 1917 |
| 1,421,545 | Osborn | July 4, 1922 |
| 2,179,478 | Bruckmoser | Nov. 14, 1939 |
| 2,253,408 | Watkins et al. | Aug. 19, 1941 |
| 2,267,956 | Steinlein et al. | Dec. 30, 1941 |